US012570286B2

(12) United States Patent　(10) Patent No.: US 12,570,286 B2
Hisakuni et al.　(45) Date of Patent: Mar. 10, 2026

(54) WORK VEHICLE

(71) Applicant: Kubota Corporation, Osaka (JP)

(72) Inventors: Tomohiko Hisakuni, Sakai (JP);
Masahiro Yamada, Sakai (JP);
Hirokazu Ito, Sakai (JP)

(73) Assignee: Kubota Corporation, Osaka (JP)

( * ) Notice: Subject to any disclaimer, the term of this
patent is extended or adjusted under 35
U.S.C. 154(b) by 866 days.

(21) Appl. No.: 17/840,736

(22) Filed: Jun. 15, 2022

(65) Prior Publication Data

US 2023/0087889 A1　Mar. 23, 2023

(30) Foreign Application Priority Data

Sep. 17, 2021　(JP) ................................. 2021-152496

(51) Int. Cl.
*B60W 30/14*　(2006.01)
*A01D 34/00*　(2006.01)
*A01D 101/00*　(2006.01)

(52) U.S. Cl.
CPC ......... *B60W 30/146* (2013.01); *A01D 34/006*
(2013.01); *A01D 2101/00* (2013.01); *B60W*
*2300/156* (2013.01); *B60W 2420/403*
(2013.01); *B60W 2556/50* (2020.02)

(58) Field of Classification Search
None
See application file for complete search history.

(56) References Cited

U.S. PATENT DOCUMENTS

2003/0120990 A1　6/2003　Elbwart et al.
2004/0218684 A1　11/2004　Golitschek Edler Von Elbwart
et al.

2010/0145581 A1 *　6/2010　Hou ....................... B60W 10/11
701/50
2011/0203243 A1 *　8/2011　Finkler ................. F02D 31/001
56/10.8
2018/0359904 A1　12/2018　Foster et al.
2019/0180502 A1 *　6/2019　England .................. G01S 7/417
2021/0031768 A1 *　2/2021　Yano ................... B60W 10/188
2021/0156688 A1　5/2021　Prabhakar (Continued)

FOREIGN PATENT DOCUMENTS

CN　107006229 A　*　8/2017　............. A01D 75/20
JP　2009284542 A　12/2009

(Continued)

OTHER PUBLICATIONS

CN-107006229-A English translation of description. Retrieved from
Espacenet on Jul. 22, 2025. (Year: 2025).*

(Continued)

*Primary Examiner* — Amelia Vorce

(74) *Attorney, Agent, or Firm* — The Webb Law Firm

(57) ABSTRACT

A work vehicle capable of traveling on a public road and in
a working field includes, a vehicle body, a public road
traveling determination unit, and a vehicle speed limiter. The
public road traveling determination unit is configured to
generate vehicle body position information regarding a
position at which the vehicle body is located, determine,
based on the vehicle body position information, whether or
not the vehicle body is traveling on the public road, and
output a determination result. The vehicle speed limiter is
configured to limit a vehicle speed in accordance with the
determination result.

8 Claims, 6 Drawing Sheets

(56)                    References Cited

U.S. PATENT DOCUMENTS

| | | | | |
|---|---|---|---|---|
| 2021/0300263 A1* | 9/2021 | Nise | ........................ | B60R 11/04 |
| 2021/0304598 A1* | 9/2021 | Hata | ........................ | G06F 18/22 |
| 2022/0176831 A1* | 6/2022 | Huh | .................... | B60L 15/2009 |
| 2022/0268598 A1* | 8/2022 | Mori | .................... | G01C 21/387 |
| 2022/0305909 A1* | 9/2022 | Ueyama | .............. | B60W 30/146 |
| 2022/0410894 A1* | 12/2022 | Foster | ................. | G06V 20/588 |
| 2024/0418841 A1* | 12/2024 | Dgani | ................... | G01S 7/4972 |

FOREIGN PATENT DOCUMENTS

| | | | |
|---|---|---|---|
| JP | 2010257261 A | 11/2010 |
| JP | 201749683 A | 3/2017 |
| JP | 2019166942 A | 10/2019 |
| JP | 202136785 A | 3/2021 |
| JP | 2021136881 A | 9/2021 |

OTHER PUBLICATIONS

Tofael Ahamed, Navigation of an Autonomous Tractor Using Multiple Sensors, Jan. 2006, pp. 1-163.

* cited by examiner

WORK VEHICLE

CROSS REFERENCE TO RELATED APPLICATION

The application claims priority to Japanese Patent Application No. 2021-152496, filed Sep. 17, 2021, the disclosure of which is hereby incorporated by reference in its entirety.

BACKGROUND OF THE INVENTION

1. Field of the Invention

The present invention relates to a work vehicle that travels on public roads and in working fields.

2. Description of the Related Art

JP 2009-284542A (Patent Document 1) discloses a display device for a work vehicle that causes a display monitor to display a camera image of a rear view of the vehicle body if a determination means, which determines whether or not the vehicle is traveling in a working field or traveling on a public road, determines that the vehicle is traveling in a working field, and that causes the display monitor to display an instrument image indicating the vehicle state during traveling if the determination means determines that the vehicle is traveling on a public road. The determination means determines that the vehicle is traveling in a working field if operation of a work actuator is allowed, and determines that the vehicle is traveling on a public road if operation of the work actuator is prohibited. Also, the determination means determines that the vehicle is traveling in a working field if a gear is switched to a low-speed and high-torque speed stage, and determines that the vehicle is traveling on a public road if the gear is switched to a high-speed and low-torque speed stage. Further, the determination means determines that the vehicle is traveling in a working field if a vehicle speed of a predetermined value or less is detected, and determines that the vehicle is traveling on a public road if a vehicle speed that exceeds the predetermined value is detected.

JP 2021-036785A (Patent Document 2) discloses a tractor that has a control device for raising and lowering a work machine that is attached to a rear part of a travelable body in a raisable and lowerable manner, and a locking operation detector for detecting an operation of a lock mechanism for locking or unlocking a pedal coupler with left and right brake pedals being coupled to each other. The control device of this tractor determines that the vehicle is traveling on a road if the locking of the lock mechanism is detected, and lifts the work machine to a predetermined lifting position. Patent Document 2 also discloses that pressing of a public road travel button is used to determine traveling on a road.

PATENT DOCUMENTS

[Patent Document 1] JP 2009-284542A
[Patent Document 2] JP 2021-036785A

In recent years, regulations concerning agricultural and forestry vehicles are becoming stricter in various countries. For example, the vehicle speed is limited to a speed limit (e.g., 10 km/hour) or less when a grass mower travels on a public road. The work vehicle according to Patent Document 1 determines whether the vehicle is traveling in a working field or traveling on a public road and changes the display state of the display monitor. However, Patent Document 1 contains no description of changing the vehicle speed. The work vehicle according to Patent Document 2 changes the position of the work machine to the predetermined lifting position if it is determined that the vehicle is traveling on a road. However, Patent Document 2 contains no description of changing the vehicle speed. Moreover, the determination of traveling on a public road in Patent Documents 1 and 2 depends on the vehicle state or operation performed by an operator, and accurate determination cannot be expected.

SUMMARY OF THE INVENTION

In view of the foregoing situation, the present invention aims to provide a work vehicle that is capable of appropriately limiting the vehicle speed based on public road traveling determination.

A work vehicle capable of traveling on a public road and in a working field according to the present invention includes: a vehicle body; a public road traveling determination unit configured to generate vehicle body position information regarding a position at which the vehicle body is located, determine based on the vehicle body position information whether or not the vehicle body is traveling on the public road, and output a determination result; and a vehicle speed limiter configured to limit a vehicle speed in accordance with the determination result.

According to this configuration, the vehicle body position information regarding the position at which the vehicle body is located is generated. It is determined based on the vehicle body position information whether or not the vehicle body is located on a public road, that is, whether or not the vehicle body is traveling on a public road. If it is determined that the vehicle body is traveling on a public road, the vehicle speed of this work vehicle is limited by the vehicle speed limiter in such a manner as not to exceed the speed limit on the public road stipulated by the regulations applied to this work vehicle.

To realize an objective and accurate public road traveling determination, the work vehicle in a preferable embodiment of the present invention further includes: a satellite positioning module configured to output positioning data; and a map position calculator configured to calculate a map position of the vehicle body based on the positioning data, wherein the public road traveling determination unit generates, as the vehicle body position information, matching information indicating a positional relationship between the vehicle body and the public road by performing map matching processing based on the map position, and determines based on the matching information whether or not the vehicle body is traveling on the public road. In this configuration, public road traveling determination is performed by means of the principles of car navigation systems installed in automobiles or the like. Map information used in car navigation systems or the like contains accurate information regarding the locations of public roads. Whether or not the vehicle body is traveling on a public road can be accurately determined by comparing the map position calculated from the positioning data and the positions of the public roads contained in the map information (map matching).

Precise map information and a high-performance computation means (computer) are necessary for rapidly performing map matching processing, and are recently available at low cost. For this reason, the work vehicle in a preferable embodiment of the present invention further includes a map matching unit configured to execute the map matching processing and included in the public road traveling determination unit mounted in the vehicle body.

The work vehicle in a preferable embodiment of the present invention further includes a map matching unit configured to execute the map matching processing and constructed in a server computer capable of performing data communication with the public road traveling determination unit mounted in the vehicle body. In this configuration, precise map information and a high-performance computation means that are needed to configure the map matching unit are constructed in a server computer that can be shared by many work vehicles, which is advantageous in terms of the cost. Furthermore, the server computer includes a map matching unit that has precise and larger-scale map information and a high-performance computation means compared with a map matching unit installed in each work vehicle. Thus, accurate and quick public road traveling determination is enabled.

When the vehicle body position is calculated with use of positioning data from the satellite positioning module, it may be difficult to calculate the vehicle body position if the satellite signal conditions deteriorate. Moreover, map matching processing cannot be executed when the work vehicle travels on a public road that is not listed in map information. Therefore, to supplement the above public road traveling determination technique, or to replace the above public road traveling determination technique, the work vehicle in a preferable embodiment of the present invention further includes: a surrounding image generation unit configured to generate a surrounding image relative to the vehicle body; and a surrounding public road information generator configured to generate, as the vehicle body position information, surrounding public road information indicating a positional relationship between the vehicle body and the public road that is recognized within the surrounding image based on the surrounding image, wherein the public road traveling determination unit determines based on the surrounding public road information whether or not the vehicle body is traveling on the public road. In this configuration, the surrounding public road information indicating the positional relationship between the vehicle body and a recognized public road is generated as the vehicle body position information with use of an image recognition technique, based on the surrounding image relative to the vehicle body generated by the surrounding image generation unit. If the positional relationship between the vehicle body and the public road is understood, whether or not the vehicle body is traveling on the public road can be determined.

The surrounding image that is needed to recognize a public road can be generated with use of an image captured by a camera. To recognize a public road in a captured image, a conventional image recognition technique or an image recognition technique that uses machine learning such as deep learning is convenient. Therefore, in a preferable embodiment of the present invention, the surrounding image generation unit is a camera unit configured to generate a captured image as the surrounding image.

A point cloud image obtained by a laser radar unit, which is known as a lidar, can also be used as a surrounding image for recognizing a public road, in addition to an image captured by a camera. An image recognition technique that uses machine learning such as deep learning is suitable in order to recognize a public road in the point cloud image. For this reason, in a preferable embodiment of the present invention, the surrounding image generation unit is a laser radar unit configured to generate a point cloud image as the surrounding image.

A mode in which the work vehicle performs map matching processing and a mode in which a server computer performs map matching processing have been proposed above. For the same reason, as for the surrounding public road information generator for generating surrounding public road information indicating the positional relationship between a public road and the vehicle body based on the surrounding image generated by the surrounding image generation unit, a mode in which the work vehicle includes the surrounding public road information generator and a mode in which a server computer includes the surrounding public road information generator are also proposed. In other words, in a preferable embodiment of the present invention, the public road traveling determination unit includes the surrounding public road information generator. In another preferable embodiment, the surrounding public road information generator is constructed in a server computer capable of performing data communication with the public road traveling determination unit.

In a preferable embodiment of the present invention, the vehicle speed limiter controls the vehicle speed such that the vehicle speed is lower than or equal to a vehicle speed limit on the public road in response to the determination result indicating that the vehicle body is traveling on the public road.

The work vehicle in a preferable embodiment of the present invention further includes: a work machine; a work motor configured to supply motive power to the work machine; and a work controller configured to perform control to prohibit driving of the work motor in response to the determination result indicating that the vehicle body is traveling on the public road.

DETAILED DESCRIPTION OF PREFERRED EMBODIMENTS

In this specification, the term "front" means forward in a front-back direction (traveling direction) of the vehicle body, and the term "rear" means backward in the front-back direction (traveling direction) of the vehicle body, unless otherwise stated. The terms "left-right direction" and "lateral direction" mean the transverse direction of the vehicle body (vehicle width direction) that is orthogonal to the front-back direction of the vehicle body. The terms "up" and "down" refer to a positional relationship along the vertical direction of the vehicle body, and indicate a relationship based on the ground height.

Figure 1:
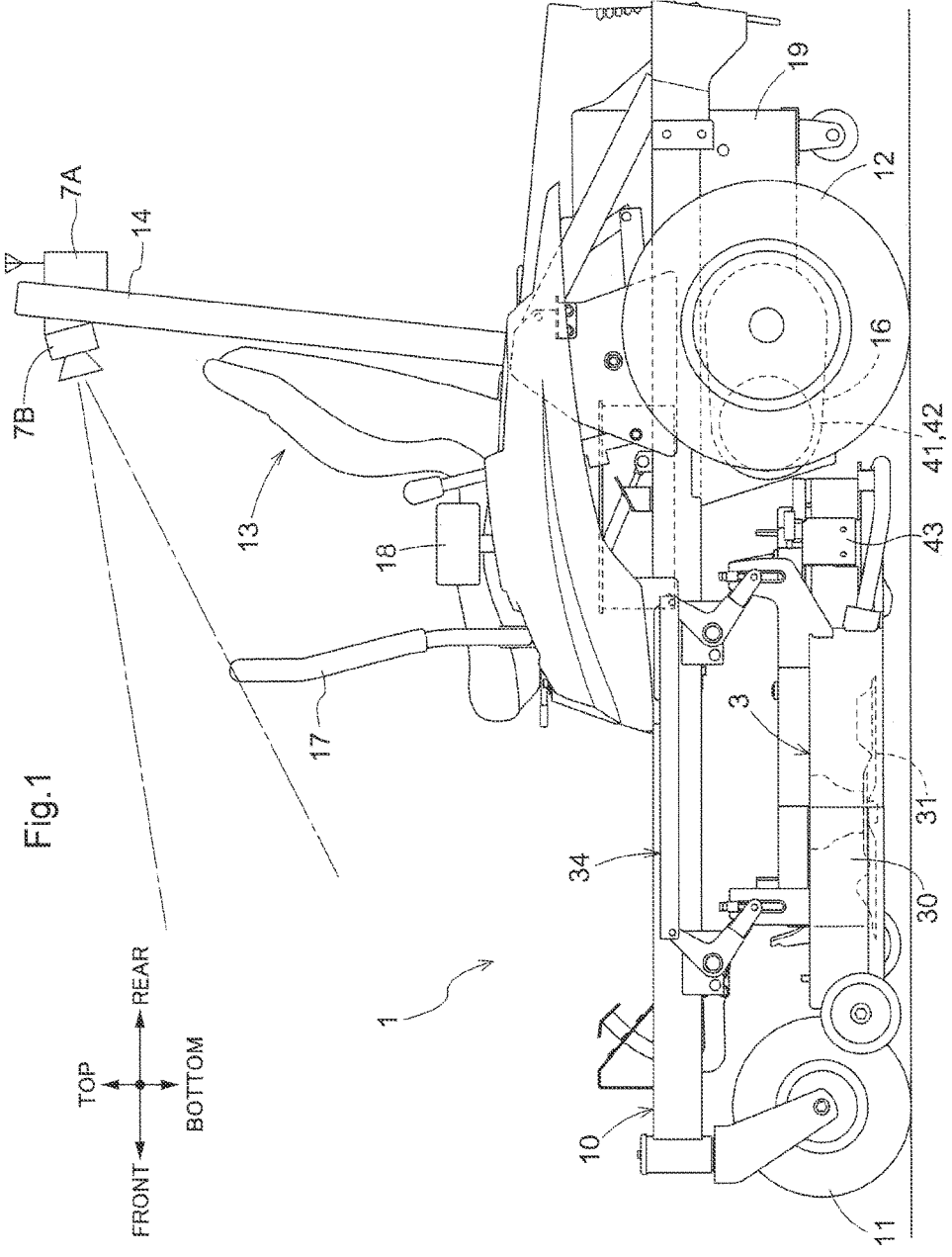
FIG. 1 is an overall side view of a grass mower, which is an example of a work vehicle.
Figure 2:
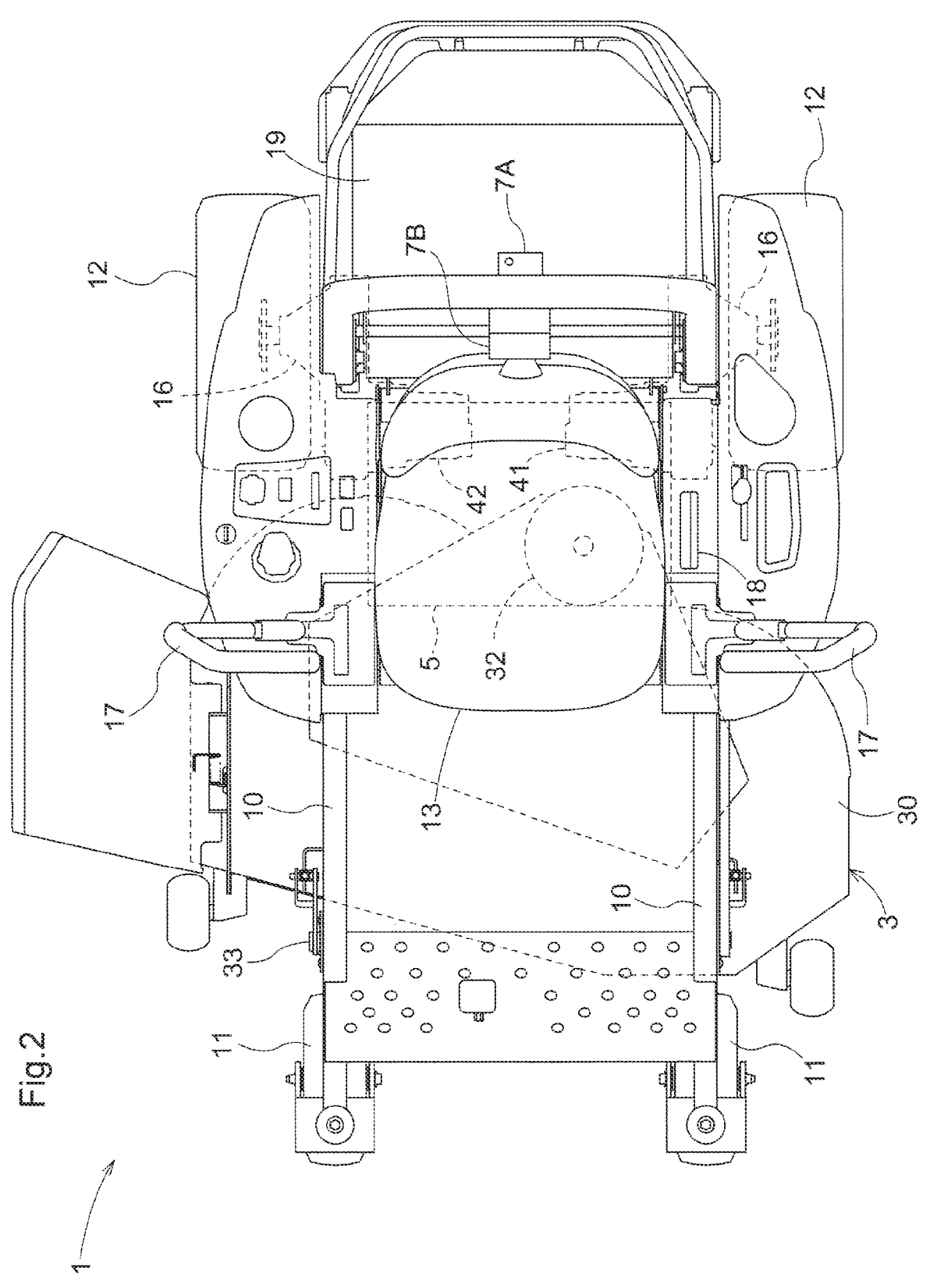
FIG. 2 is an overall plan view of the grass mower.
Figure 3:
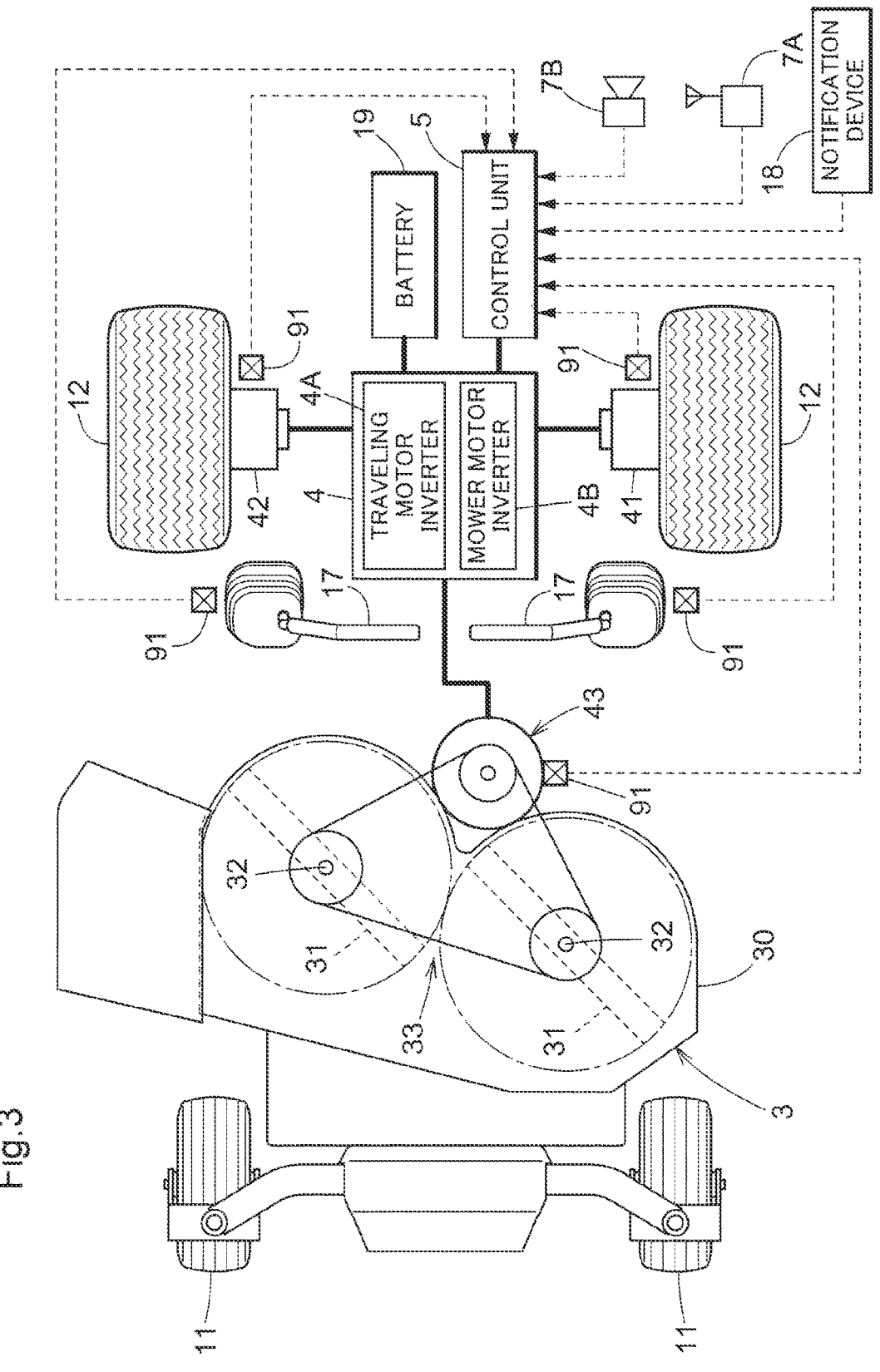
FIG. 3 is a schematic diagram showing a motive power system and a control system of the grass mower.

Next, a specific embodiment of a work vehicle according to the present invention will be described with reference to the drawings. FIG. 1 is a side view of a riding electric grass mower (hereinafter simply referred to as "grass mower)", which is an example of the work vehicle. FIG. 2 is a plan view of the grass mower. FIG. 3 is a schematic diagram showing a motive power system and a control system of the grass mower.

The grass mower includes a pair of left and right front wheels 11 supported by a front part of the vehicle body 1, a pair of left and right rear wheels 12 supported by a rear part of the vehicle body 1, and a mower unit (work machine) 3 supported below the vehicle body 1 between the front wheels 11 and the rear wheels 12. A battery accommodating space for accommodating a battery 19 is located between the left and right rear wheels 12. The vehicle body 1 also has an operator seat 13, a ROPS frame 14, and so on.

The vehicle body 1 has a frame 10, which includes left and right longitudinal beams extending in the front-rear direction and a cross beam that couples these longitudinal beams. The ROPS frame 14, which has a gate-like shape, has a lower end that is coupled to the frame 10.

The front wheels 11 are caster type wheels, and the rear wheels 12 are drive wheels. A left motor 41 and a right motor 42, which serve as a pair of left and right traveling motors, are located on the inner side of the respective rear wheels 12. Motive power of the left motor 41 and the right motor 42 is transmitted to the respective rear wheels 12 via a speed reduction mechanism 16.

Gear shift levers 17 are located on both sides of the operator seat 13. The left motor 41 is stopped by operating the left gear shift lever 17 to a neutral position. The left motor 41 is operated in the forward direction by operating the left gear shift lever 17 to the forward side, and is operated in the reverse direction by operating the left gear shift lever 17 to the reverse side. Similarly, the right motor 42 is moved in the same manner as the aforementioned left motor 41 by operating the right gear shift lever 17 to the neutral position, the forward side, and the reverse side. In other words, the left and right rear wheels 12 are driven independently of each other to the forward or reverse side by operating the left and right gear shift levers 17, thus causing the vehicle body 1 to forward or reverse, or to turn leftward or rightward.

The ROPS frame 14 has a top portion to which a satellite positioning module 7A, which includes an antenna for receiving satellite radio waves, and a surrounding image generation unit 7B, which generates a surrounding image showing a surrounding view relative to the vehicle body 1, are attached.

A notification device 18 for notifying the operator of various information is located on a side of the operator seat 13. The notification device 18 includes a display for giving the operator a visual message and/or a speaker for giving the operator an audio message.

The mower unit 3 includes a mower deck 30 and two rotary cutting blades 31.

The left cutting blade 31 and the right cutting blade 31 are next to each other in the transverse direction of the vehicle body. The cutting blades 31 are located in an internal space surrounded by a top wall and side walls of the mower deck 30. The mower deck 30 can be swung up and down by a lift link mechanism 34.

FIG. 3 shows a motive power system and a control system of the grass mower.

A mower motor (work motor) 43, which supplies motive power to rotary shafts 32 with the cutting blades 31 attached thereto, is attached to the mower deck 30. Motive power is transmitted from the mower motor 43 to the rotary shafts 32 by a belt transmission mechanism 33. A left motor 41 is provided to rotate the left rear wheel 12, and a right motor 42 is provided to rotate the right rear wheel 12. In this embodiment, the left motor 41 and the right motor 42, which are driven independently of each other, are traveling motors.

The left motor 41, the right motor 42, and the mower motor 43 receive supply of electric power from an inverter 4. The inverter 4 includes a traveling motor inverter 4A that supplies electric power to the left motor 41 and the right motor 42, and a mower motor inverter 4B that supplies electric power to the mower motor 43. The inverter 4 is driven based on a control signal from the control unit 5. The inverter 4 is connected to a battery 19, which serves as an electric power source. The control unit 5 is connected to the satellite positioning module 7A, the surrounding image generation unit 7B, the notification device 18, and a device sensor group 91 for detecting the states of various devices.

Figure 4:
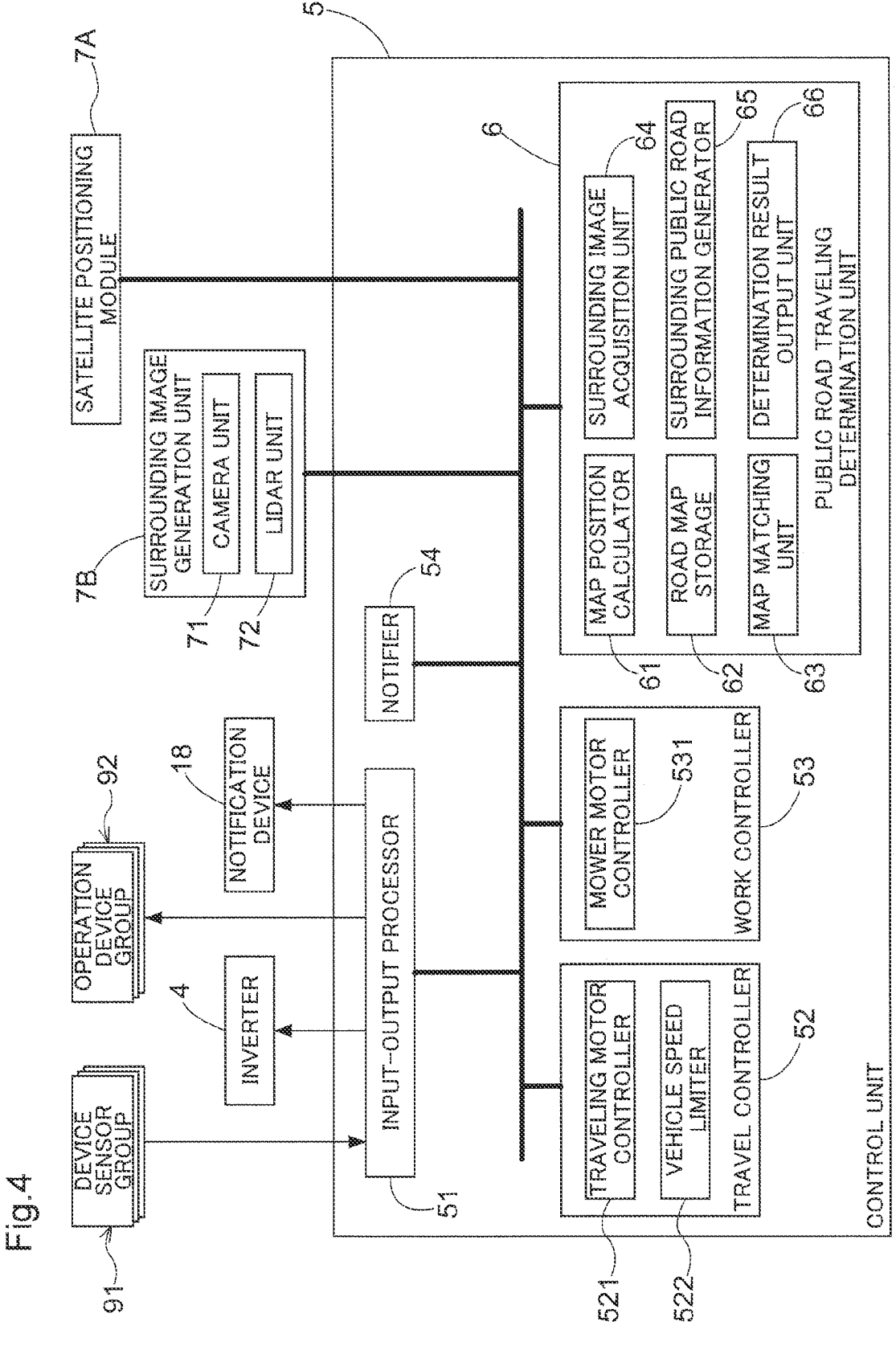
FIG. 4 is a functional block diagram showing functions of the control system of the grass mower.
Figure 5:
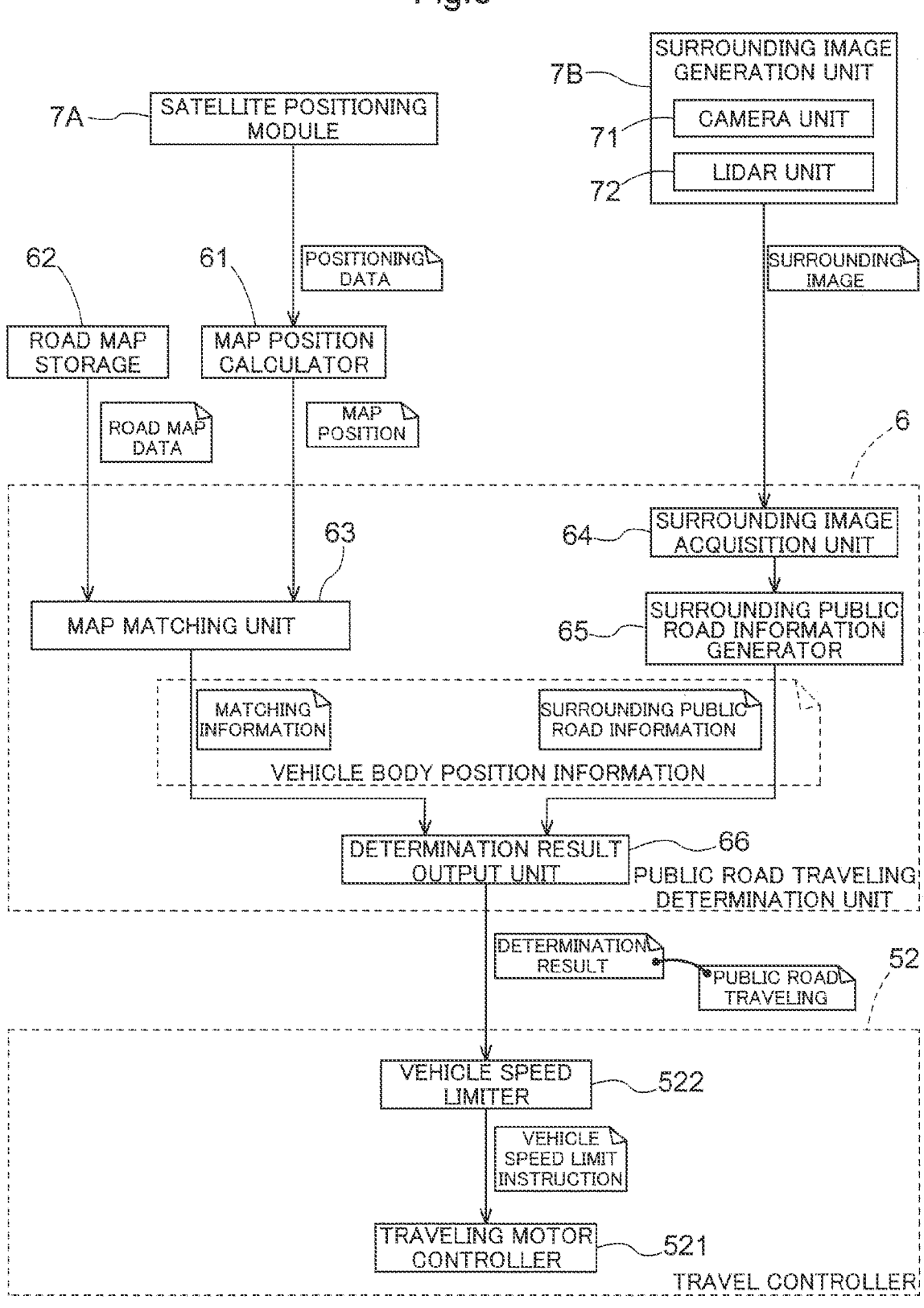
FIG. 5 shows a flow of information in vehicle speed limitation based on public road traveling determination.

FIG. 4 is a functional block diagram showing the control system constructed in the above grass mower and functions of the control system of the grass mower. FIG. 5 shows a flow of information in vehicle speed limitation based on public road traveling determination.

The control unit 5, which is a core element of the control system of the grass mower, includes an input-output processor 51 that functions as an input-output interface. The input-output processor 51 is connected to the inverter 4, the notification device 18, the device sensor group 91, an operation device group 92, and so on.

The satellite positioning module 7A and the surrounding image generation unit 7B are connected to the control unit 5 through an in-vehicle LAN. The surrounding image generation unit 7B in this embodiment includes a camera unit 71 that generates a captured image of the surroundings of the vehicle body 1 as a surrounding image, and a laser radar unit (hereinafter referred to as a lidar unit) 72 that generates a point cloud image of the surroundings of the vehicle body 1 as a surrounding image. However, the surrounding image generation unit 7B may alternatively include only one of them, or may be able to use them selectively.

The control unit 5 includes a travel controller 52, a work controller 53, a notifier 54, a public road traveling determination unit 6, and so on.

The public road traveling determination unit 6 includes a map position calculator 61, a road map storage 62, a map matching unit 63, a surrounding image acquisition unit 64, a surrounding public road information generator 65, and a determination result output unit 66. The map position calculator 61 calculates a vehicle body position, which is the position of the vehicle body 1 on the map, based on positioning data from the satellite positioning module 7A, which adopts the GNSS, as shown in FIG. 5. The map matching unit 63 performs map matching processing based on the map position calculated by the map position calculator 61 and road map data, which is map information extracted from the road map storage 62, and generates matching information serving as vehicle body position information that indicates the positional relationship between the vehicle body 1 and a public road. The vehicle body position information includes content indicating whether or not the vehicle body 1 is located (traveling) on a public road. The determination result output unit 66 outputs the determination result that is based on the vehicle body position information. This determination is public road traveling determination performed with use of the satellite positioning module 7A. If it is determined that the vehicle body 1 is traveling on a public road, a determination result with content indicating "traveling on a public road" is output and given to the travel controller 52.

Next, the public road traveling determination performed with use of the camera unit 71 of the surrounding image generation unit 7B will be described. The surrounding image acquisition unit 64 retrieves a surrounding image captured by the camera unit 71, executes image preprocessing such as filter processing, which include masking, level adjustment, edge enhancement, or the like, and gives the preprocessed surrounding image to the surrounding public road information generator 65. The surrounding public road information generator 65 has an image recognition function of receiving input data that is the preprocessed surrounding image given by the surrounding image acquisition unit 64 and outputting public road recognition data indicating the position of a public road recognized in the surrounding image. This image recognition function is favorably constructed by a machine learning model, such as deep learning. The surrounding public road information generator 65 receives image capture data regarding the direction in which the camera unit 71 captures an image, and the field of view during the image capture. Accordingly, the surrounding public road information generator 65 also has a function of generating, as the vehicle body position information, surrounding public road information that indicates the positional relationship between the vehicle body 1 and a public road, based on the image capture data and the position of the public road in the surrounding image indicated by the public road recognition data. In other words, the vehicle body position information includes content that indicates whether or not the vehicle body 1 is located (traveling) on a public road. The determination result output unit 66 outputs the determination result that is based on the vehicle body position information. This determination is public road traveling determination performed with use of the camera unit 71 of the surrounding image generation unit 7B. If it is determined that the vehicle body 1 is traveling on a public road, a determination result with content indicating "traveling on a public road" is output and given to the travel controller 52.

The public road traveling determination performed with use of the lidar unit 72 of the surrounding image generation unit 7B is similar to the aforementioned public road traveling determination performed with use of the camera unit 71. Differences lie in that the surrounding image acquisition unit 64 receives a three-dimensional point cloud image instead of a captured image as a surrounding image, and that the surrounding public road information generator 65 receives the point cloud image as input data and outputs public road recognition data that indicates the position of a public road recognized in the point cloud image. A point cloud that constitutes the point cloud image has data regarding distances from the vehicle body 1. Thus, the surrounding public road information generator 65 can generate vehicle body position information indicating the positional relationship between the vehicle body 1 and the public road, based on the output public road recognition data. The determination result output unit 66 outputs the determination result that is based on the vehicle body position information. This determination is public road traveling determination performed with use of the lidar unit 72 of the surrounding image generation unit 7B.

The travel controller 52 includes a traveling motor controller 521 and a vehicle speed limiter 522. The traveling motor controller 521 controls the traveling motor inverter 4A to adjust the rotational speed of the left motor 41 in accordance with the operation amount of the left gear shift lever 17 and to adjust the rotational speed of the right motor 42 in accordance with the operation amount of the right gear shift lever 17. While the vehicle body 1 is traveling on a public road, the vehicle speed limiter 522 gives the traveling motor controller 521 a vehicle speed control instruction in such a manner as to conform to the vehicle speed limit stipulated by the regulations. In other words, if the determination result output unit 66 gives the vehicle speed limiter 522 a determination result indicating "traveling on a public road", the vehicle speed limiter 522 gives the traveling motor controller 521 a vehicle speed control instruction in such a manner as to conform to a preset vehicle speed limit on the public road.

The work controller 53 includes a mower motor controller 531. The mower motor controller 531 controls the mower motor inverter 4B to drive the mower motor 43. The mower motor controller 531 can also be configured to be prohibited from driving the mower motor 43 if the mower motor controller 531 receives a determination result indicating "traveling on a public road" from the determination result output unit 66.

The notifier 54 makes various types of information to notify the operator into a notification signal, and sends this signal to the notification device 18. The notification device 18 makes sound output and/or display output based on the received notification signal. For example, the notification device 18 causes a lamp to turn on or blink while the grass mower is traveling on a public road, and gives a notification with use of a sound or the lamp if the grass mower is traveling at a lower speed than the speed that is based on an operation of the gear shift levers 17, in response to a vehicle speed limit instruction.

In the functional block diagram shown in FIG. 4, the control unit 5 of the grass mower includes all the functional parts of the public road traveling determination unit 6. Alternatively, some specific functional parts of the public road traveling determination unit 6 may be constructed in a computer in a remote location that can perform data communication with the control unit 5 of the grass mower.

Figure 6:
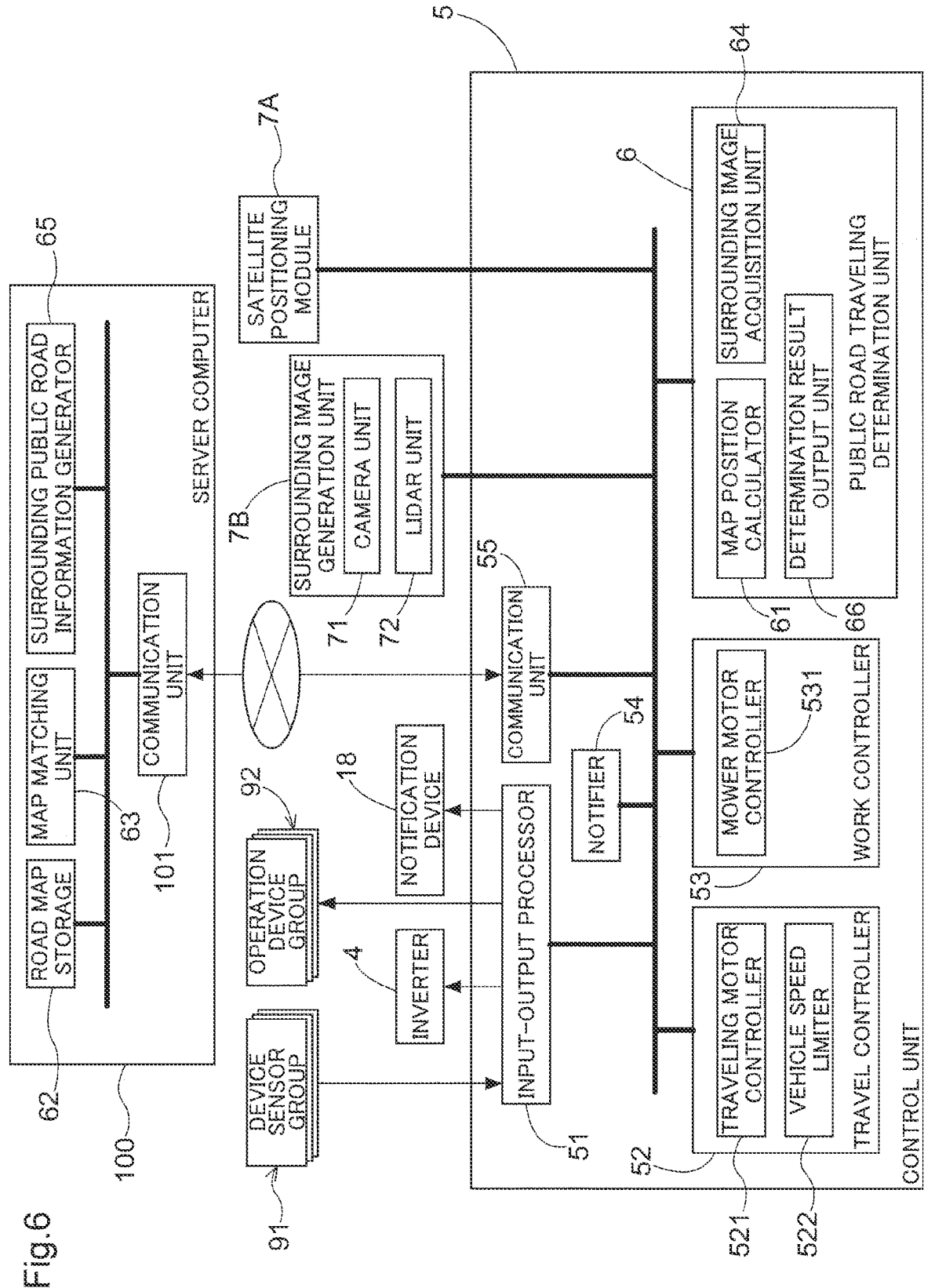
FIG. 6 is a functional block diagram showing functions of the control system of a grass mower according to another embodiment.

For example, the road map storage 62, the map matching unit 63, and the surrounding public road information generator 65 in an embodiment shown in FIG. 6 are constructed in a server computer 100 in a remote place that can perform data communication with the control unit 5. To perform data communication with the server computer 100, the control unit 5 has a communication unit 55 that is capable of performing data communication with a communication unit 101 of the server computer 100 over the Internet, a public data line, or the like. In the case of performing public road traveling determination with use of the satellite positioning module 7A in this embodiment, the map position (body position) calculated by the map position calculator 61 is sent to the server computer 100 via the communication unit 55. The map matching unit 63 of the server computer 100 performs map matching processing based on the sent map position and the road map data stored in the road map storage 62, generates matching information serving as vehicle body position information that indicates the positional relationship between the vehicle body 1 and a public road, and transfers the generated matching information to the control unit 5 of the grass mower. The public road traveling determination unit 6 of the control unit 5 performs public road traveling determination based on the received vehicle body position information. The determination result output unit 66 outputs the determination result.

Furthermore, in the case of performing public road traveling determination with use of the surrounding image generation unit 7B in the embodiment shown in FIG. 6, the surrounding image (a captured image or a point cloud image) acquired by the surrounding image acquisition unit 64 is sent to the server computer 100 via the communication unit 55. The surrounding public road information generator 65 of the server computer 100 generates, based on the sent surrounding image, vehicle body position information that indicates the positional relationship between the vehicle body 1 and the public road, and transfers the generated vehicle body position information to the control unit 5 of the grass mower. The public road traveling determination unit 6 of the control unit 5 performs public road traveling determination based on the received vehicle body position information. The determination result output unit 66 outputs the determination result.

OTHER EMBODIMENTS (1) The above embodiment adopts an electric grass mower as a work vehicle. However, the present invention is also applicable to grass mowers that use internal combustion engines.

(2) The functional blocks shown in FIGS. 4 and 6 are examples. A plurality of functional blocks can be bundled into one functional block, or one functional block can be divided into a plurality of functional blocks.

(3) The embodiment uses a map matching technique in the public road traveling determination performed with use of the satellite positioning module 7A. If the area in which the work vehicle acts is limited to some extent, a so-called background matching technique may alternatively be adopted in which an image is acquired in advance at a predetermined position in a predetermined image capturing direction, and the position of the vehicle body 1 is calculated by comparing a surrounding image group with a captured image that is captured in real time. The background matching technique is advantageous in that it does not require the satellite positioning module 7A.

(4) The above embodiment has adopted a grass mower as a work vehicle that travels on a public road and in a working field. However, the present invention is also applicable to any other work vehicles, tractors, harvesters, sprinkler trucks, construction machinery, and the like.

Note that the configurations disclosed in the above embodiment (which also includes other embodiments, hereinafter the same) can be combined with configurations disclosed in any other embodiments as long as no contradiction arises. The embodiments disclosed in the present specification are examples, and the embodiments of the present invention are not limited thereto. The present invention can be modified as appropriate without departing from the objects of the present invention.

INDUSTRIAL APPLICABILITY

The present invention is applicable to work vehicles that is capable of traveling on a public road and in a working field.

DESCRIPTION OF REFERENCE SIGNS

1: Vehicle body
3: Work machine (Mower unit)
5: Control unit
6: Public road traveling determination unit
7A: Satellite positioning module
7B: Surrounding image generation unit
18: Notification device
43: Work motor (Mower motor)
51: Input-output processor
52: Travel controller
55: Communication unit 61: Map position calculator
62: Road map storage
63: Map matching unit
64: Surrounding image acquisition unit
65: Surrounding public road information generator
66: Determination result output unit
71: Camera unit
72: Lidar unit
100: Server computer
101: Communication unit
521: Traveling motor controller
522: Vehicle speed limiter

The invention claimed is:

1. A work vehicle capable of traveling on a public road and in a working field, the work vehicle comprising:
   a vehicle body;
   a ROPS frame having a gate-like shape whose lower end is coupled to the vehicle body;
   a surrounding image generation unit configured to generate a surrounding image relative to the vehicle body;
   a surrounding public road information generator configured to generate, as vehicle body position information regarding a position at which the vehicle body is located, surrounding public road information indicating a positional relationship between the vehicle body and the public road that is recognized within the surrounding image based on the surrounding image;
   a public road traveling determination unit configured to determine based on the vehicle body position information whether or not the vehicle body is traveling on the public road, and output a determination result; and
   a vehicle speed limiter configured to limit a vehicle speed in accordance with the determination result,
   wherein the surrounding image generation unit is attached to a top portion of the ROPS frame.

2. The work vehicle according to claim 1, further comprising:
   a satellite positioning module configured to output positioning data; and
     a map position calculator configured to calculate a map position of the vehicle body based on the positioning data,
     wherein the public road traveling determination unit generates, as the vehicle body position information, matching information indicating a positional relationship between the vehicle body and the public road by performing map matching processing based on the map position, and determines based on the matching information whether or not the vehicle body is traveling on the public road.

3. The work vehicle according to claim 2, further comprising:
   a map matching unit configured to execute the map matching processing and included in the public road traveling determination unit mounted in the vehicle body.

4. The work vehicle according to claim 1,
   wherein the surrounding image generation unit is a camera unit configured to generate a captured image as the surrounding image.

5. The work vehicle according to claim 1,
   wherein the surrounding image generation unit is a laser radar unit configured to generate a point cloud image as the surrounding image.

6. The work vehicle according to claim 1, wherein the public road traveling determination unit includes the surrounding public road information generator.

7. The work vehicle according to claim 1, wherein the vehicle speed limiter controls the vehicle speed such that the vehicle speed is lower than or equal to a vehicle speed limit on the public road in response to the determination result indicating that the vehicle body is traveling on the public road.

8. The work vehicle according to claim 1, further comprising:

a work machine;

a work motor configured to supply motive power to the work machine; and a work controller configured to perform control to prohibit driving of the work motor in response to the determination result indicating that the vehicle body is traveling on the public road.

\* \* \* \* \*